United States Patent

Millar et al.

(10) Patent No.: US 6,842,697 B1
(45) Date of Patent: Jan. 11, 2005

(54) METHOD FOR DOWNHOLE LOGGING

(75) Inventors: John William Aiden Millar, Wiltshire (GB); Richard Hedley Clarke, Wiltshire (GB); William Peter Stuart-Bruges, Hampshire (GB)

(73) Assignees: Groundflow Ltd., Wiltshire (GB); Sondex Ltd., Hampshire (GB)

( * ) Notice: Subject to any disclaimer, the term of this patent is extended or adjusted under 35 U.S.C. 154(b) by 0 days.

(21) Appl. No.: 09/936,790

(22) PCT Filed: Mar. 15, 2000

(86) PCT No.: PCT/GB00/00969

§ 371 (c)(1),
(2), (4) Date: Sep. 17, 2001

(87) PCT Pub. No.: WO00/55651

PCT Pub. Date: Sep. 21, 2000

(30) Foreign Application Priority Data

Mar. 18, 1999 (GB) .............................................. 9906096

(51) Int. Cl.⁷ .............................. G01V 3/00; G01V 3/18
(52) U.S. Cl. .......................................... 702/2; 324/353
(58) Field of Search ........................ 702/2, 8; 367/35; 324/353; 73/152.02, 152.05

(56) References Cited

U.S. PATENT DOCUMENTS

| | | | | |
|---|---|---|---|---|
| 2,974,273 | A | | 3/1961 | Vogel et al. ................... 324/3 |
| 3,599,085 | A | * | 8/1971 | Semmelink ................. 324/386 |

(List continued on next page.)

FOREIGN PATENT DOCUMENTS

| | | | | |
|---|---|---|---|---|
| EP | 0043 768 A1 | 7/1981 | ............ G01V/3/26 |
| EP | 0281946 A2 | 3/1988 | ............ G01V/1/40 |
| EP | 0281946 | 9/1988 | |
| EP | 0 512 756 A1 | 4/1992 | ............ G01V/11/00 |
| GB | 2226 886 | 12/1989 | ............ G01V/11/00 |
| GB | 2318185 A | 9/1997 | ............ G01V/1/40 |
| RU | 1772775 | 10/1992 | |
| SU | 1772775 A1 | 1/1990 | ............ G01V/3/08 |
| WO | WO 93/07514 | 10/1992 | ............ G01V/1/40 |
| WO | 9307514 | 4/1993 | |
| WO | WO 94/28441 | 5/1994 | ............ G01V/3/26 |
| WO | WO 97/14980 | 10/1996 | ............ G01V/3/26 |
| WO | 9714980 | 4/1997 | |
| WO | WO 99/05545 | 7/1998 | ............ G01V/3/26 |
| WO | WO 00/55650 | 3/1999 | ............ G01V/3/26 |
| WO | WO 00/55651 | 3/2000 | ............ G01V/3/26 |

OTHER PUBLICATIONS

"Electroseismic Technique for Measuring the Properties of Rock Surrounding a Borehole", Millar et al., WO 97/14980, Apr. 24, 1997.*

Geophysical Applications of Electro Kinetic Conversion By A.H. Thompson And G.A. Gist Exxon Production Research Company Houston, Texas.

A Study Of The Influence Of Moisture On The Magnitude Of The Seismoelectric Effect In Sedimentary Rocks By A Laboratory Method E.I. Parkomenko And Chzhao Tsze–San (Chao Chien San).

International Search Report, PCT/GB 98 02234, Dec. 15, 1998, 3 pp.

*Primary Examiner*—John Barlow
*Assistant Examiner*—Toan M. Le
(74) *Attorney, Agent, or Firm*—Ronald B. Sherer; Bartlett & Sherer

(57) ABSTRACT

A method and apparatus for measuring the properties such as permeability of the rock surrounding a borehole in which a directional seismic or sonic signal is generated downhole and propagated into the surrounding formation to generate an electrokinetic signal and the focus of the seismic signal is moved in three dimensions in the surrounding rock by physically moving the source or by having two seismic sources which generate oscillating seismic signals at different frequencies and the focus of the seismic signal is varied by wave interference or wave interaction.

15 Claims, 1 Drawing Sheet

U.S. PATENT DOCUMENTS

| | | | |
|---|---|---|---|
| 3,975,674 A | 8/1976 | McEuen | 324/1 |
| 4,009,609 A | 3/1977 | Sayer et al. | 73/155 |
| 4,043,192 A | 8/1977 | Shuck | 73/155 |
| 4,403,146 A | 9/1983 | Neufeld | 250/262 |
| 4,427,944 A * | 1/1984 | Chandler | 324/353 |
| 4,804,918 A | 2/1989 | Vail, III | 324/303 |
| 4,821,035 A | 4/1989 | Hanson et al. | 340/856 |
| 4,904,942 A | 2/1990 | Thompson | 324/323 |
| 5,192,952 A | 3/1993 | Johler | 342/22 |
| 5,229,553 A | 7/1993 | Lester et al. | 181/102 |
| 5,414,673 A | 5/1995 | Scherbatskoy | 367/25 |
| 5,417,104 A * | 5/1995 | Wong | 73/38 |
| RE34,975 E | 6/1995 | Orban et al. | 367/34 |
| 5,503,001 A * | 4/1996 | Wong | 73/38 |
| 5,689,068 A * | 11/1997 | Locatelli | 73/152.02 |
| 5,841,280 A | 11/1998 | Yu et al. | 324/323 |
| 5,877,995 A | 3/1999 | Thompson et al. | 367/14 |
| 5,903,153 A | 5/1999 | Clarke et al. | 324/323 |
| 6,225,806 B1 * | 5/2001 | Millar et al. | 324/353 |

* cited by examiner

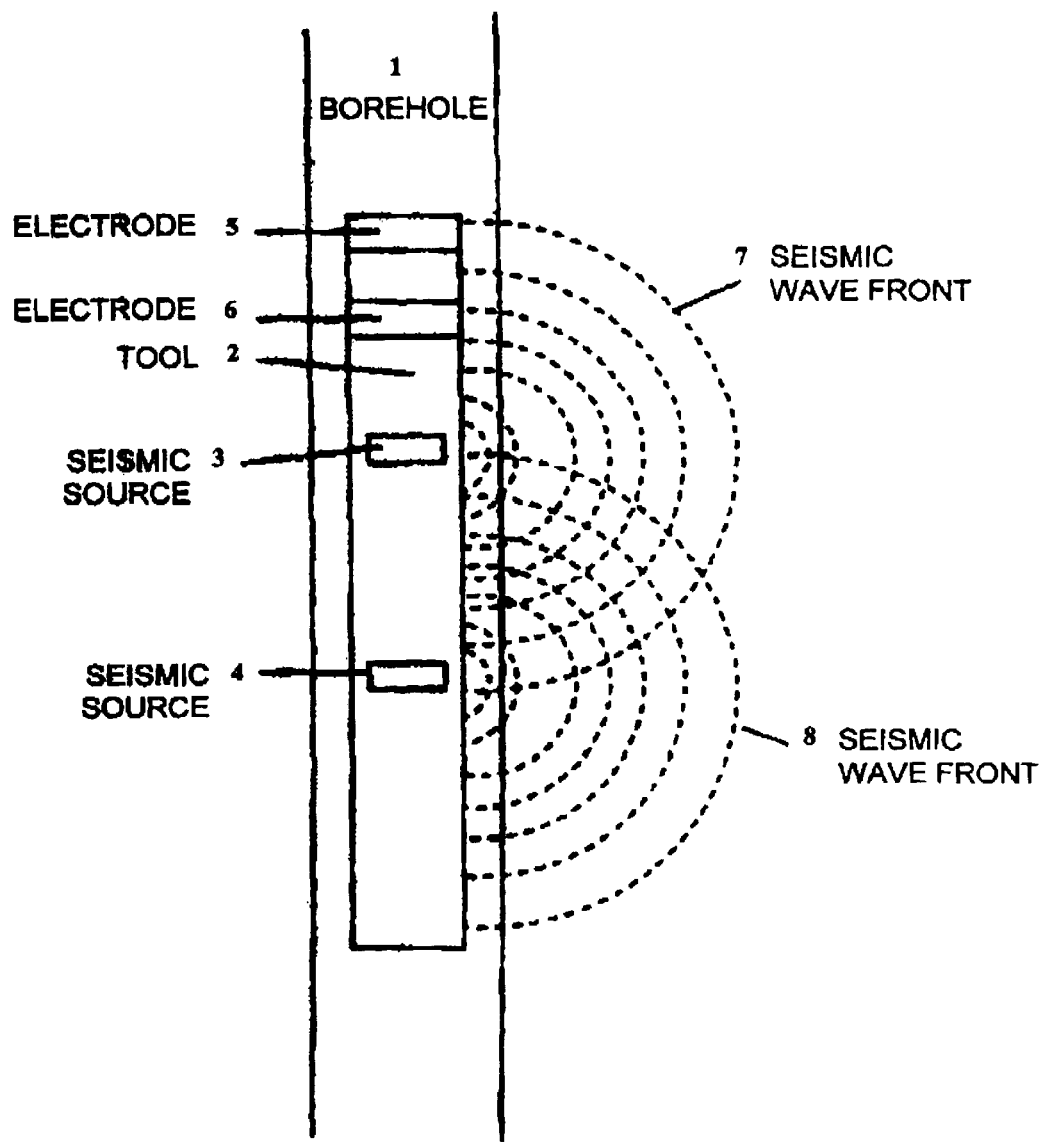

METHOD FOR DOWNHOLE LOGGING

The present invention relates to a method and equipment for measuring the properties of subsurface rock from a tool lowered down a borehole. In particular it relates to a method and equipment for measuring such properties as the response time and amplitude of the electrokinetic coefficient, porosity and permeability of fluid-bearing porous rocks.

The measurement of permeability of rocks surrounding a borehole is important in assessing the location of water or oil reserves, including the quality and quantity of the reservoir rock. Existing methods are unable to measure the permeability of a porous rock directly with any accuracy from a downhole tool.

In addition to its value in the assessment of the quality and quantity of water or oil reservoirs, rock permeability is very important in determining at what rate and at what cost these fluids can be produced from boreholes.

U.S. Pat. No. 4,427,944 discloses a method and apparatus for investigating the permeability of earth formations traversed by a borehole in which a source of mechanical excitation is positioned in contact with the surface of a borehole and actuated to excite the formation and produce an electrokinetic potential in the formation which is detected inside the borehole, measured and used to calculate the permeability.

Patent Application PCT/GB96/02542, now U.S. Pat. No. 6,225,806, discloses a method of measuring the properties of rock surrounding a borehole in which a seismic pulse is generated downhole which propagates outwards from the borehole to produce electrokinetic signals which are detected within the borehole and used to measure the properties of the surrounding rock. In this application the seismic pulse radiates outwards in all directions and this has been found to give superior results to uni-directional propagation of the seismic pulse as described in U.S. Pat. No. 4,427,944.

We have now devised an improved method for downhole logging.

According to the invention there is provided a method for measuring the properties of a formation traversed by a borehole in which a directional seismic or sonic signal is generated downhole and is propagated into the surrounding formation and an electrokinetic signal generated by the seismic or sonic signal is detected by detecting means and in which the spatial distribution of the outgoing seismic signal is adjusted so that the electrokinetic signals are generated from different zones around the source.

The seismic signal is generated by the generation of a seismic or sonic shock downhole which propagates a seismic signal into the surrounding rock.

The distribution of the seismic signal can be varied in three dimensions so that it can be varied azimuthally with respect to source of the seismic shock in the borehole and can be rotated radially about a circle with the source at the centre of the circle, or by a combination of these two modes the distribution of the seismic signal can be varied in any direction.

The direction of the seismic signal can be varied mechanically by physically turning the source, for example a substantially uni-directional seismic source can be rotated so the direction of the seismic signal is rotated and it can be moved so that the direction of the seismic signal moves up and down. Alternatively the seismic signal can be propagated omni-directionally and a shield with an aperture or "window" can be positioned around the source so that the seismic signal propagates through the window; moving the location of the window e.g. by rotating the shield will cause the direction of the seismic signal to change.

Preferably the direction of the seismic signal is changed by wave interference or wave interaction of two or more sources acting together to produced a seismic signal which is focussed in a particular direction or location so that, by varying the frequency, amplitude and/or phases of the sources of the seismic shock the spatial distribution, direction and location of the outgoing seismic signal can be changed.

The superposition, constructive interference and combination of wave fronts to produce a spatially focussed wave is known and the calculations and controls need to produce a specified focussed wave are known.

In an embodiment of the present invention there are two or more separate sources of the seismic shock spaced apart from each other and there are means to vary the amplitude, frequency and/or phase independently. The source of the seismic shock preferably propagates a seismic signal in substantially all directions so that the direction of the combined signal produced can be varied in three dimensions.

The source of the seismic signal is preferably not in contact with the borehole wall but positioned substantially centrally within the borehole.

Each of the seismic signals is preferably propagated radially outwards in all directions through the borehole fluid (the fluid in the borehole e.g. drilling mud etc.) and, subject to distortion by the borehole wall and variations in the rock, the seismic signal propagates outwards substantially uniformly in all directions. It is the combination of two or more seismic signals which controls the total seismic signal generated and enables the direction to be changed.

The electrical signal generated within the surrounding rock is received and detected at the tool within the borehole from substantially the chosen location or direction.

This invention also provides apparatus for measuring the properties of rocks surrounding a borehole, which apparatus comprises a casing adapted to be lowered down a bore hole in which casing there is a seismic means for generating seismic signals and a means for varying the direction of the seismic signal and having associated therewith, a means adapted to detect electrical signals generated by the effect of a seismic shock generated by seismic means.

The means for generating the seismic signals preferably generates a series of pressure pulses or, more preferably, a continuous pressure oscillation, at one or more finite frequencies. It may consist of a mechanical vibrational device, an electromagnetic device, a sparker source, an explosive source, an airgun operated hydraulically or electrically or any other such conventional sonic source designed for use on a downhole tool but preferably it should be a magnetostrictive or piezoelectric transducer whose signal is controllable electrically. The term "seismic pulse" can include a pulse which can be referred to as a sonic or acoustic pulse.

A preferred means for enabling the seismic signals to be generated radially comprises a cylindrical chamber having holes in its side, which when downhole will be full of drilling fluid with the sides of the chamber being close to the sides of the borehole, there being a means to transmit a shock or applied force to the fluid in the chamber so as to cause the shock to be transmitted through the fluid in the chamber through the holes into the surrounding rock. The holes should be distributed substantially uniformly around the casing so that the shock is transmitted in all directions. The shock or force can be applied by any of the means referred to above.

The electrical signals can be detected by means of a pair of electrodes positioned within the borehole close to the borehole wall or, alternatively, a coil receiver mounted on the tool or, preferably, an electrode pair or short dipole antenna mounted on the tool aligned centrally within the borehole. In the equipment of the present invention it is convenient to use one or two electrical receivers placed above and below the acoustic sources, the case of the dipole antennae preferably aligned vertically or horizontally above and below the source and in the case of the coils with the plane of the coil aligned vertically or horizontally at the centre of the borehole.

The electrical receiver preferably consists of one or two pairs of electrodes forming a short dipole antenna with electrically isolated ends or two coils with electrically isolated lines. For each pair the ends are preferably connected to an amplifier which amplifies the signals whilst keeping them electrically isolated; this is carried out by referring the potential of each end independently to a floating reference potential. The signals are preferably amplified and converted to digital form before being communicated (e.g. by wire) to the surface for recording and processing.

Preferably the means for detecting the electrical signals compares the potential at the ends, in the case of the dipole antenna, or measures the electrical field strength in the case of the coil. The potential at the ends of dipole antenna in the one case or of the coil in the other, are compared by connecting them to an amplifier in which the potentials are preferably referred to a non-earthed reference (a virtual earth) and these new potentials are amplified and compared. Such a procedure allows amplification with very little distortion of the potential to be measured and with a high degree of common-mode noise rejection and is superior to other conventional methods of amplification. Preferably the non-earthed reference potential is that of a common line in the amplification and data acquisition circuitry of the receiver and is not connected directly to earth.

Preferably there is provision for isolating and balancing the signals from each of the electrodes or coils before they reach the amplifier circuit in order to giver the maximum common-mode rejection of electromagnetic noise. This balancing can be achieved manually before running in a given borehole to compensate for variations in electrode performance in a given hole or by means of a suitable electronic circuit giving continuous feedback whereby continual adjustment can be made.

Each seismic source preferably continuously emits sound simultaneously on at least two finite frequencies with the resultant oscillation the sum of the various sinusoidal pressure oscillations. Preferably if two frequencies are used these frequencies are between 5 Hz and 100 KHz, e.g. about 1 KHz and 10 KHz. By variation and combination of these signals the direction of the combined signal can be varied.

Preferably the amplified electrical signals are demodulated with respect to the source frequencies and the amplitude and phase relative to the source sampled at a frequency of about 1–100 Hz per channel and converted from analogue to digital form, of 12 or 16 bit accuracy. The digital data transmitted to surface is recorded as a data file and can then be processed.

The seismic signal can be generated whilst the apparatus is lowered or raised up from the borehole, thus providing a continuous or semi-continuous measurement of rock along the borehole.

The seismic signal can be generated whilst the apparatus is lowered or raised up from the borehole, thus providing a continuous or semi-continuous measurement of rock along the borehole.

The amplitude and response of the electrokinetic response to an acoustic pulse have been shown to be closely related to the electrokinetic coefficient and the permeability of the target porous rock respectively. For a sonic oscillation of a known frequency the amplitude and phase of the electrical response with response to the source is a function of both electrokinetic coefficient and permeability; however, measurement of amplitude of response on two frequencies allows each of these properties of the rock to be determined independently. After processing a log of rock permeability, electrokinetic coefficient, electrical conductivity and porosity can be produced. Alternatively, if the amplitude and phase of the electrokinetic response at a single frequency are measured are measured, the permeability and porosity may be derived from these.

It is believed that the method of the present invention makes use of an electrokinetic effect in which the seismic wave generated by the seismic source and, passing through the interface of the borehole with the surrounding porous rock and through interfaces within the rock where the fluid properties change, stimulates electrical signals detected at the receiving electrodes or coils. The seismic oscillation within the porous rock give rise to fluid flow within the rock and as cations and anions adhere with differing strengths to capillary walls, a resulting electric dipole is generated within the rock. This electric dipole distorts the quasi-static electric field within the slightly conducting medium of the rock and this distortion propagates back to the tool, where it is measured.

The invention is illustrated in the accompanying drawings which illustrate schematically an embodiment of the invention.

Referring to the drawing, a borehole (1) has a tool (2) lowered down it, the tool (2) incorporates two independent seismic sources (3) and (4) which can generate a seismic signal radially in all directions. There are electrodes (5) and (6) connected to an amplifier and a computer which can record and interpret the signals received.

The seismic sources (3) and (4) are remotely controlled so the amplitude, frequency and/or phase of the shock they generate can be independently varied.

In use the tool (2) is lowered downhole and the seismic sources (3) and (4) operated to generate a seismic wave fronts shown by (7) and (8) in the surrounding rock formation. These wave fronts will generate an interference pattern within the rock formation to produce a focussed wave and a seismic signal will be generated which depends on the combination i.e. location of the focus, of the two wave fronts at any one location. By varying the amplitude, frequency and/or phases of the sources (3) and (4) the direction and strength of the signal formed by the combination of the signals from (3) and (4) can be controlled and varied in three dimensions.

The electrodes (5) and (6) receive the electrokinetic signal generated by this combined seismic signal and it is transmitted to an amplifier and the computer for analysis and recording.

What is claimed is:

1. A method for measuring the properties of a formation traversed by a borehole in which a directional seismic or sonic signal is generated downhole and is propagated into the surrounding formation and an electrokinetic signal generated by the seismic or sonic signal is detected by detecting means and in which the spatial distribution of the outgoing seismic signal is adjusted so that the electrokinetic signals are generated from different zones around the source of the seismic or sonic signal.

2. A method as claimed in claim 1 in which the direction of the seismic signal is varied in three dimensions azimuthally with respect to the source of the seismic shock in the borehole.

3. A method as claimed in claim 1 in which the direction of the seismic shock is rotated radially about a circle with the source of the seismic shock at the centre of the circle.

4. A method as claimed in claim 3 in which the direction of the seismic signal is varied mechanically by physically turning the source.

5. A method as claimed in claim 3 in which the seismic signal is substantially uni-directional and the source is rotated so the direction of the seismic signal is rotated and is also moved so that the direction of the seismic signal moves up and down.

6. A method as claimed in claim 3 in which the seismic signal is propagated omni-directionally and a shield with an aperture is positioned around the source so that the seismic signal propagates through the aperture and the direction of the seismic signal is changed by moving the location of the aperture.

7. A method as claimed in claim 1 in which the direction of the seismic signal is changed by wave interference or wave interaction of two or more sources acting together to produced a seismic signal which is focused in a particular direction or location and by varying the frequency, amplitude and/or phases of the sources of the seismic signal the spatial distribution, direction and location of the outgoing seismic signal is changed.

8. A method as claimed in claim 7 in which there are means to vary the amplitude, frequency and/or phase independently and the source of the seismic signal propagates a seismic signal in substantially all directions so that the direction of the combined signal produced can be varied in three dimensions.

9. A method as claimed in claim 8 in which each seismic source continuously emits sound simultaneously on at least two finite frequencies with the resultant oscillation being the sum of the various sinusoidal pressure oscillations and by variation and combination of these signals the direction of the combined signal is varied.

10. Apparatus for measuring the properties of rocks surrounding a borehole, which apparatus comprises a casing adapted to be lowered down a bore hole, in which casing there is a seismic source means for generating seismic signals and a means for varying the direction of the seismic signal and having associated therewith, a means adapted to detect electrical signals generated in the rock surrounding the bore hole by the effect of a seismic signal generated by the seismic source means.

11. Apparatus as claimed in claim 10 in which the seismic source means for generating the seismic signals generates a series of pressure pulses or a continuous pressure oscillation, at one or more finite frequencies.

12. Apparatus as claimed in claim 11 in which there are means to physically turn the seismic source means to vary the direction of the seismic signal.

13. Apparatus as claimed in claim 11 in which there is a shield with an aperture positioned around the seismic source which source is adapted to propagate a seismic signal omni-directionally so that the seismic signal generated propagates through the aperture and there are means to move the location of the aperture so the direction of the seismic signal is varied.

14. Apparatus as claimed in claim 11 in which there are two or more sources of seismic signals acting together and means to vary the direction of the seismic signal by wave interference or wave interaction of the two or more sources to produce a seismic signal which is focused in a particular direction or location and means to vary the frequency, amplitude and/or phases of the sources of the seismic shock to change the spatial distribution, direction and location of the outgoing seismic signal.

15. Apparatus as claimed in claim 11 in which there are two or more separate sources of the seismic shock spaced apart from each other and there are means to vary the amplitude, frequency and/or phase independently of the seismic shock, the source of the seismic shock being able to propagate a seismic signal in substantially all directions so that the direction of the combined signal produced can be varied in three dimensions.

* * * * *